T. M. SHAW.
GANG-PLOW.
No. 170,778.  Patented Dec. 7, 1875.
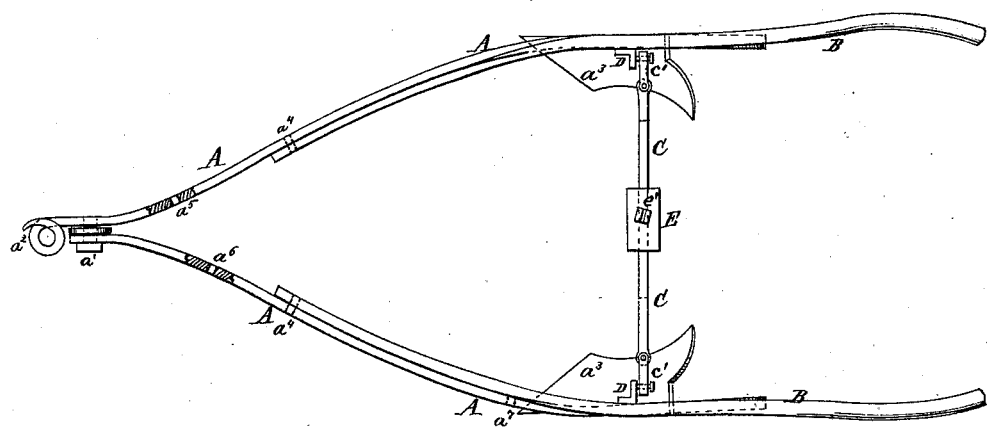
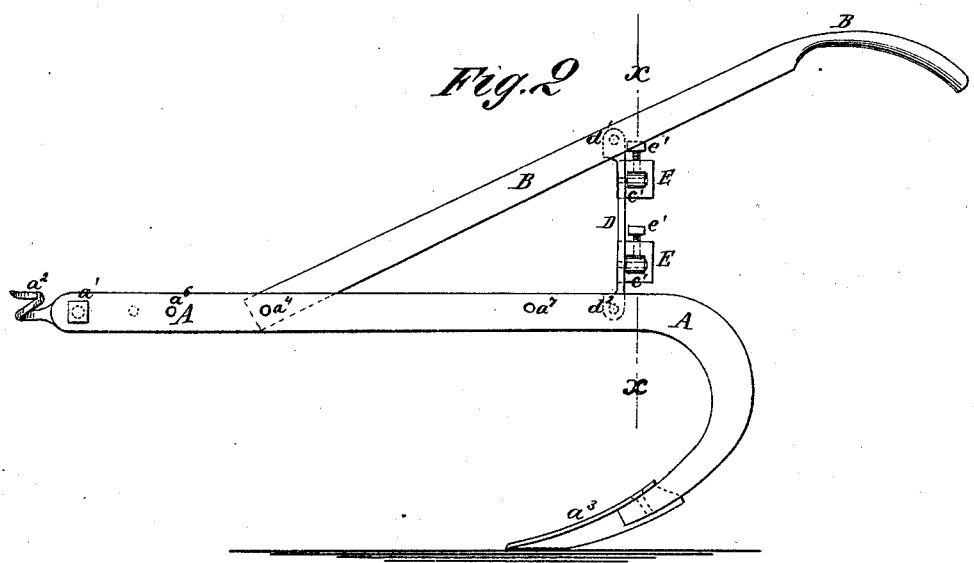
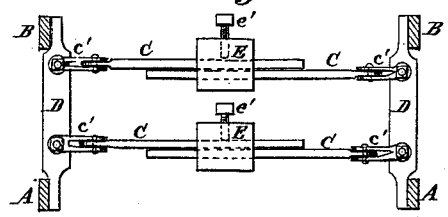
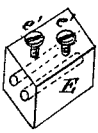
WITNESSES:  INVENTOR:
T. M. Shaw
BY
ATTORNEYS.
N. PETERS, PHOTO-LITHOGRAPHER, WASHINGTON, D. C.

UNITED STATES PATENT OFFICE.

TIMOTHY M. SHAW, OF LEBANON, TENNESSEE.

IMPROVEMENT IN GANG-PLOWS.

Specification forming part of Letters Patent No. 170,778, dated December 7, 1875; application filed September 10, 1875.

*To all whom it may concern:*

Be it known that I, TIMOTHY M. SHAW, of Lebanon, in the county of Wilson and State of Tennessee, have invented a new and useful Improvement in Cultivators and Plows, of which the following is a specification:

Figure 1 is a top view of my improved plow. Fig. 2 is a side view of the same. Fig. 3 is a vertical cross-section of the same, taken through the line $x\ x$, Fig. 2. Fig. 4 is a detail perspective view of a modified form of the adjusting-slide.

Similar letters of reference indicate corresponding parts.

The invention is a cultivator having the following characteristics, to wit: First, a frame composed of two curved beams, each provided with a shovel or plow, and adjustably connected at their front ends, so that one shovel or plow may be set in rear of the other. Second, said frame is provided with handles, which are adjustable correspondingly with themselves. Third, the beams and handles are connected by two sets of transverse parallel bars, made separately adjustable as to length, and connected to said beams and handles by means of universal joints or couplings, as hereinafter fully described.

The result of this combination and arrangement of parts is, that the handles may be adjusted so as to remain opposite each other, and the plow-beams will at the same time be held rigidly connected whatever be the adjustment of the plows, whether in gang, or one or both inclined from a vertical, to take more or less into the side of ridges, while cultivating between the rows of growing crops.

When adjusted for a breaking-plow the beams are still connected flexibly, and allow one plow to be lifted to avoid an obstruction without hindering the working of the other.

A are the plow-beams, the forward ends of which incline toward each other, and are secured to each other by a bolt, $a^1$. Upon the forward end of the beam A is formed a hook, $a^2$, for the attachment of the draft. The rear ends of the beams A are curved downward, and to them are secured the plows $a^3$. B are the handles, the forward ends of which are secured to the beams A, respectively, by the bolts $a^4$. The rear parts of the handles B are supported at the proper elevation by the standards D, the upper ends of which are secured to the said handles by the bolts $d^1$, and their lower ends are secured to the beams A by the bolts $d^2$. To the upper and lower parts of each of the standards D are pivoted the outer ends of two bars or rods, C, by means of shackles or clevises $c'$, which are pivoted to the said standards and bars by bolts, so that the rear end of each plow-beam may have a free vertical movement, and so that the said beams may have the slight longitudinal play required in turning. The inner ends of the upper and lower pairs of bars C pass through holes in the coupling-blocks E, where they are secured adjustably by set-screws $e'$, so that by simply loosening the set-screws $e'$ the rear ends of the beams A may be adjusted at any desired distance apart, and may be secured in place by again tightening the said set-screws.

When the plow is to be used for breaking up land, or other plowing that requires both furrows to be turned in the same direction, the forward end of the left-hand beam A is moved back to the bolt-hole $a^5$ in the right-hand beam A, and the bolt $a^1$ is inserted in said hole $a^5$. In this case the bolt $a^4$, that secures the forward end of the left-hand handle B, is moved forward to, and inserted in, the hole $a^6$ in said left-hand beam A. The lower end of the left-hand standard D is also moved forward to the hole $a^7$ in the left-hand beam A, and the bolt $d^2$ is inserted in said hole $a^7$. This adjustment brings one of the plows to the proper distance in advance of the other.

The coupling-bars C may be made flat, as shown in Figs. 1, 2, and 3, in which case the bars of each pair are passed through the same hole in the coupling-block E, and are secured by a single set-screw, $e^2$; or the bars C may be round, in which case they are passed through separate holes in the coupling-block E, and are secured by separate set-screws $e'$, as shown in Fig. 4.

I do not claim connecting the beams of a cultivator by means of adjustable bars, so that they may be adjusted laterally; but

I claim—

The combination of the handles B B and bars C, pivoted couplings $c'$, coupling-blocks E, and vertical movable bars D D with the plow-beams A, having the several bolt-holes specified, whereby the beams and handles may be adjusted to place the plows opposite or in advance of one another, in the manner set forth.

TIMOTHY M. SHAW.

Witnesses:
J. W. WALKER,
WILLIAM SIMMS.